March 29, 1938. J. D. RYDER 2,112,682

MEASURING AND CONTROLLING SYSTEM

Filed June 24, 1935 3 Sheets-Sheet 1

INVENTOR.
JOHN D. RYDER

BY Raymond L. Junkins
ATTORNEY.

March 29, 1938. J. D. RYDER 2,112,682
MEASURING AND CONTROLLING SYSTEM
Filed June 24, 1935   3 Sheets-Sheet 2
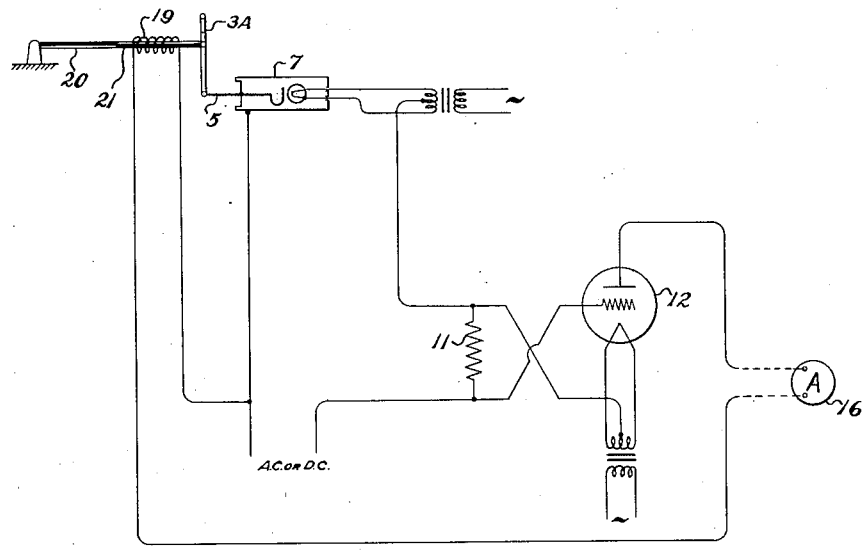
FIG. 3
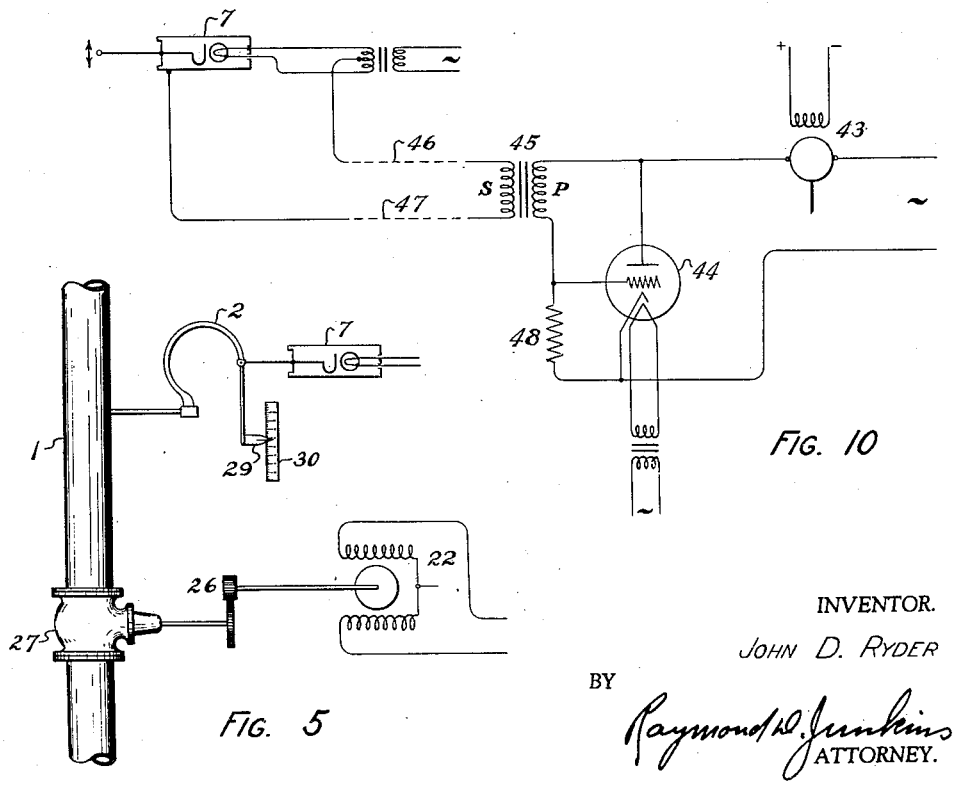
FIG. 10
FIG. 5
INVENTOR.
JOHN D. RYDER
BY
Raymond W. Jenkins
ATTORNEY.

Patented Mar. 29, 1938

2,112,682

UNITED STATES PATENT OFFICE 2,112,682

MEASURING AND CONTROLLING SYSTEM

John D. Ryder, South Euclid, Ohio, assignor to Bailey Meter Company, a corporation of Delaware Application June 24, 1935, Serial No. 28,219

8 Claims. (Cl. 172—239)

This invention relates to the art of measuring and/or controlling the magnitude of a variable quality, quantity, condition, relation, etc., and particularly such variables as temperature, pressure, rate of fluid flow, etc., although the variable may be of any physical, chemical, electrical, hydraulic, thermal, or other nature or characteristic.

In accordance with my invention I cause the effective area of an electrode of an electron discharge device to be varied proportional to the instantaneous magnitude of the condition or variable to be measured and then by a suitable measuring circuit, of which the electron discharge device is a part, I determine the magnitude of the variable, or obtain a measurement or movement representative of such magnitude.

Such measurement or movement may then be utilized in the control of the same or other variable or variables.

A primary object of my invention is to provide a measuring apparatus capable of exhibiting variations in the actual magnitude of a condition or variable substantially instantaneously with the occurrence of such variation and so that an observer will be advised of the magnitude of the condition at any time existing and not of the magnitude which existed at some time previously, except insofar as such condition might be recorded for permanent record. In other words, to avoid a time delay between the occurrence of a change in magnitude and the presentation of such change for observation upon a measuring instrument or as applied to control apparatus.

A desirable feature of the invention is that the said measurement or movement may be amplified many times and may be transmitted to a point remote relative to the variable to which the apparatus is sensitive.

An important object of the invention is the inclusion of an anti-hunting means tending to allow maximum speed of control with a minimum of over-travel or hunting.

A further object is to so arrange the control circuit that control of either a floating or positioning characteristic may be obtained.

My invention will be best understood by reference to the accompanying drawings in which I have shown preferred embodiments thereof and which will be described hereinafter. I desire to have it understood however that various changes can be made in the construction and arrangement of the parts without departing from the spirit and scope of the invention.

In the drawings:

Fig. 3 is similar to Fig. 1 with some modifications.

Figure 4:
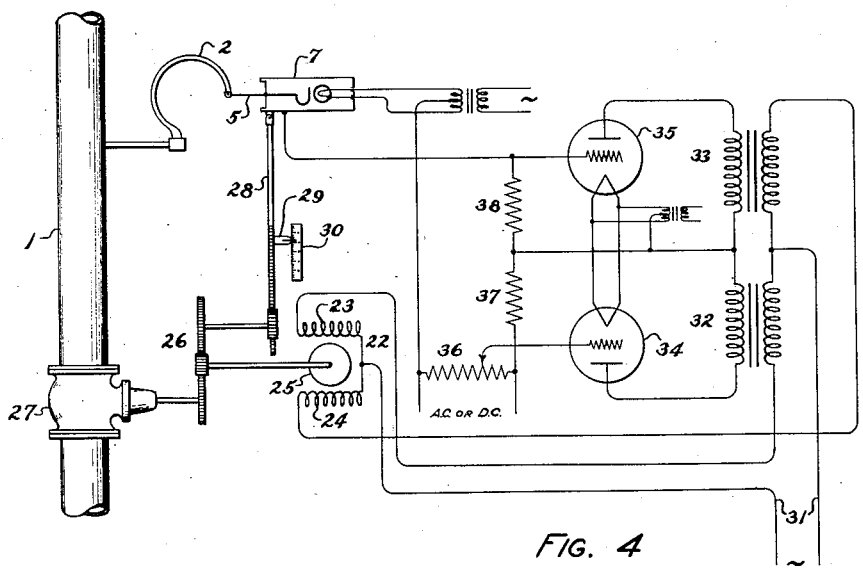
Fig. 4 illustrates a second embodiment of my invention.

Figs. 5, 6, 7, and 8 show modifications of the arrangement of Fig. 4.

Figure 9:
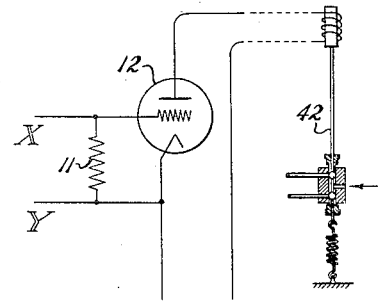
Figure 8:
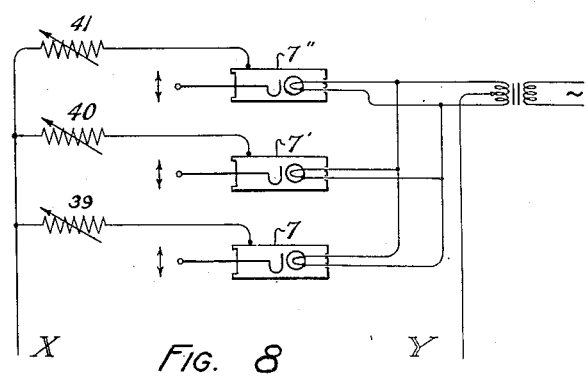

Fig. 9 illustrates a modification.

Fig. 10 shows a further embodiment of the invention.

Figure 1:
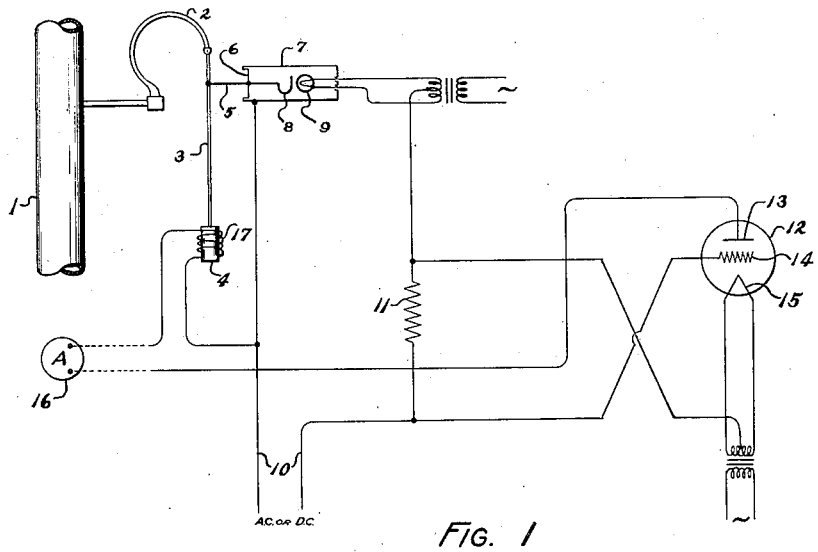
Fig. 1 is a diagram illustrating an embodiment of the invention.

Referring now in particular to Fig. 1, I therein illustrate my improved measuring apparatus and electrical circuit in connection with the remote indication of a fluid pressure. The conduit 1 may be adapted to contain a static or flowing fluid, the pressure of which is desirably to be remotely measured for visual indication or as a guide to the control of the pressure or another variable.

Sensitive to the fluid pressure is a Bourdon tube 2, from the free end of which is suspended a link 3 carrying at its lower end the plunger 4 of a solenoid. The link 3 is pivotally connected to move an element 5 passing through and fastened to a thin metal diaphragm 6 forming an end closure of an electron discharge device 7.

The electron discharge device 7 is preferably a 2-element tube having a movable anode 8 and a heated cathode 9. The envelope, of which the diaphragm 6 forms a part, may be of metal or of glass, but preferably of such shape and construction that the diaphragm 6 will flex to allow movement of the anode 8 within the envelope as a result of positioning the member 5 through means external to the envelope, such as the Bourdon tube 2.

Such an electron discharge device or tube is preferably a high vacuum tube of the regulating type, wherein the effective electron emitting or electron receiving areas of the electrodes are varied without necessarily changing the distance between the electrodes. As shown in the drawings, movement of the anode 8 relative to the cathode 9 causes a change in magnitude of the electric current which flows through the tube, and while the tube is not of the stop-start grid-control type, nevertheless movement of the anode away from the cathode in sufficient extent may reduce the current passage to zero.

There is normally a current flow from the A. C. or D. C. source 10, through the anode 8, cathode 9, and resistor 11; varied in quantity by the position of the anode relative to the cathode. Such current flow produces a voltage drop across the resistor 11, which is applied to the input circuit of a multi-electrode grid-controlled electron discharge device 12 having an anode 13, a grid 14, and a cathode 15. Such a tube is preferably a relay and amplifying tube and is shown as of a heated filament type.

The circuit is such that the grid 14 is negative relative to the cathode 15 in varying amounts, dependent upon the voltage drop across the resistor 11, thereby giving control of current passage through the tube 12.

Current flow through the tube 7 representative of position of the Bourdon tube 2 thus controls voltage drop across the resistor 11 which in turn controls current flow though the tube 12. The circuit including the tube 12 may be traced as follows: source 10, resistor 11, cathode 15, anode 13, ammeter 16, solenoid coil 17, and source 10.

The ammeter 16 may be located remotely and provides a visual indication of fluid pressure within the conduit 1. Current flow through the solenoid winding 17 produces a varying effect upon the core 4 to oppose movement of the Bourdon tube and balance the same. The inclusion in the arrangement of the solenoid 4, 17 for opposing movement of the Bourdon tube 2 tends to eliminate error producing effects of tube characteristics and voltage variations throughout the circuit, and has the further advantage that the Bourdon tube need not be accurately calibrated, for it does not have to assume a position definitely indicative of pressure but each time returns almost to the original position. The system comes to a state of equilibrium regardless of the position of rest of the free end of the Bourdon tube and when such state of equilibrium between pressure of the fluid within the Bourdon tube and pull on the solenoid 4 is accomplished, then the current flow through the ammeter 16 causing the pull on 4, is a measure of the fluid pressure.

Figure 2:
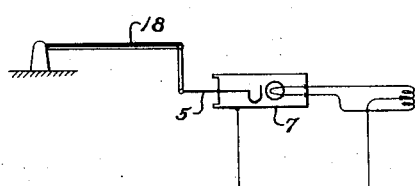
Fig. 2 shows a modification of a fragment of Fig. 1.

At Fig. 2 the element 5 may be positioned through movement of the free end of a bimetallic member 18 sensitive to ambient temperature.

At Fig. 3 I show a circuit similar to that of Fig. 1 except that the solenoid 4, 17 is replaced by a heater element 19, the coil of which receives the current of the ammeter circuit in a manner similar to the coil 17 of Fig. 1. The link 3A at its upper end is connected to the Bourdon tube or other variable sensitive device for positioning the same. Normally the link 3A positions the member 5 as in Fig. 1, but such positioning is opposed or modified by a bimetallic thermostatic element 20 tending to correct for variations in ambient temperature. Current flow through the circuit of the indicating device 16 passes through the coil 19 heating the thermostatic element 21 for producing a force or movement opposing and balancing that of the link 3A in a manner similar to the solenoid 4, 17 of Fig. 1.

The arrangement of Fig. 4 provides a torque amplifier without electrical contacts. It is suitable for use as a controller, since it provides a ready means of running a reversing and variable speed motor in either direction upon a change in the value of the variable, and the motor will run at a speed proportional to the change if an induction motor is used.

I show at 22 a motor having opposed field windings 23, 24 connected in an alternating current circuit and opposedly wound in a manner such that when the windings 23 and 24 are equally energized a rotor 25 is not urged to rotation in either direction; but when the windings are unequally energized rotation of the rotor 25 will occur in predetermined direction and at a speed dependent upon the unbalance of the energization of the windings.

The rotor 25 is connected by means of suitable gearing 26 to position a regulating valve 27 controlling fluid pressure within the conduit 1, and at the same time to position a rack 28 connected to the tube 7 for positioning the same. The rack 28 carries a pointer 29, relative to an index 30, for providing a visual indication of fluid pressure within the conduit 1.

The field windings 23, 24 are connected in parallel across an alternating current power source 31; and differentially in the primary circuit of transformers 32, 33 respectively; the current flow for energization of 23, 24 being controlled by varying the impedance of the primaries upon variation in the current flow through the related secondaries. The secondaries are connected respectively in circuit with electron discharge devices 34, 35 and the arrangement is such that if one of the devices 34, 35 is passing current and the other is not passing current, then one of the field coils 23, 24 is energized and the other is de-energized, so that the rotor 25 is caused to rotate continuously at maximum speed in a given direction. If however both the devices 34, 35 are passing current in equal amounts then the field windings 23, 24 are energized in equal amounts and the rotor 25 is not urged to rotation in either direction. The latter is a condition which exists when pressure within the Bourdon tube 2 is steady and does not vary from a previous condition. Immediately upon a variation or change in the pressure, however, the conditions become unbalanced to an extent wherein one of the field coils 23, 24 is energized to a greater extent than the other and the rotor 25 is caused to rotate in predetermined direction, and at a speed dependent upon the amount of unbalance of the field coil energization.

The output of the devices 34, 35 is controlled by a circuit including the grids respectively of the devices, as well as the tube 7, whose anode is positioned relative to its cathode by movements of the Bourdon tube 2.

Certain features of the electrical circuit of Fig. 4 are disclosed and claimed in my co-pending application, Serial No. 718,427, filed March 31, 1934. A voltage divider 36 as well as resistances 37, 38 are provided in the control circuit of the devices 34, 35. If there is no current flow through the tube 7, the electron discharge device 35 passes current and the device 34 does not. When a maximum current flows through the tube 7 then the device 34 passes current but the device 35 does not. At all intermediate values of current flow through the tube 7 the two devices 34, 35 pass proportionate amounts of current and proportionally or differentially vary the impedance of the secondaries of transformers 32, 33, resulting in a corresponding variation in energization of the field windings 23, 24, and if the energization of the windings is unbalanced, then rotation of the rotor 25 is in predetermined direction and at a predetermined speed dependent upon the amount of unbalance.

It will be observed that when the anode of the tube 7 is in a predetermined position relative to the cathode there will exist a condition of equal current flow through the primaries of the transformers 32, 33, through the secondaries, and through the windings 23, 24 of the motor 22, and that the rotor 25 will not be urged to rotate in either direction. Immediately upon a change in fluid pressure effective upon the Bourdon tube 2, the anode of the tube 7 will be moved relative to its cathode, thus increasing or decreasing the current flow through the tube 7 and unbalancing the current flow through the devices 34, 35 and correspondingly through the field windings 23, 24 so that the rotor 26 will be caused to rotate in predetermined direction and at a speed dependent upon the amount of movement of the Bourdon tube 2.

Such rotation of the rotor 26 will be in direction to position the valve 27 for correcting the value of the fluid pressure, or tending to return the pressure to a predetermined value. Simultaneously the rack 28 will be moved in a direction to reposition the anode-cathode relation through movement of the entire tube 7 relative to the Bourdon tube 2. As such movement progresses, the current flow through the tube 7 is returned toward its predetermined value, thus slowing down rotation of the motor 22 until eventually the fields become balanced and the rotor stops moving. The Bourdon tube itself assumes at all times a position representative of fluid pressure, as does the pointer 29 relative to the index 30, from the interrelation of which may be visually observed the value of the fluid pressure.

Such a control as I have described for Fig. 4 is known as a "positioning" control where there is a definite position of the valve 27 corresponding to every value of the fluid pressure. At Fig. 5 I illustrate a modification wherein there is no tie-back such as the rack 28 for movement of the tube 7, and this is known as a "floating" control wherein there is no definite positioning of the valve 27 for each value of fluid pressure within the conduit. Herein the pointer 29 is positioned relative to the index 30 directly by the Bourdon tube. The motor 22 is geared through suitable reduction means to position the valve 27.

Figure 6:
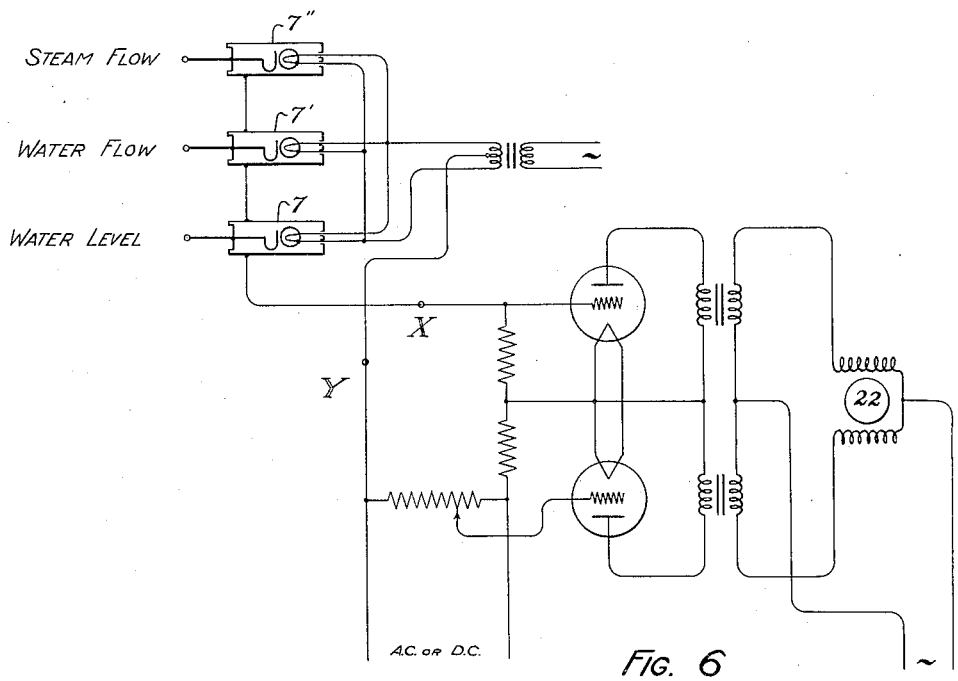

At Fig. 6 I illustrate an arrangement similar to that of Fig. 4 wherein that part of the circuit on the drawings to the right of the points X, Y is identical with the showing of Fig. 4, but that part to the left illustrates an arrangement for combining the effect of a plurality of variable conditions upon the motor 22 differentially or additively. I illustrate three tubes 7, 7', 7'', connected in parallel in a manner such that the current flow applied to the right-hand part of the circuit at the points X, Y is the sum of the separate current flows of the three tubes, each representative of the value of the variable adapted to mechanically position its anode.

For example, this might be used in the control of the supply of water fed to a steam generating boiler wherein the motor 22 would be adapted to position a water regulating valve and from an interrelation of a measure of steam flow from the boiler, a measure of water flow to the boiler, and a measure of water level within the boiler.

Figure 7:
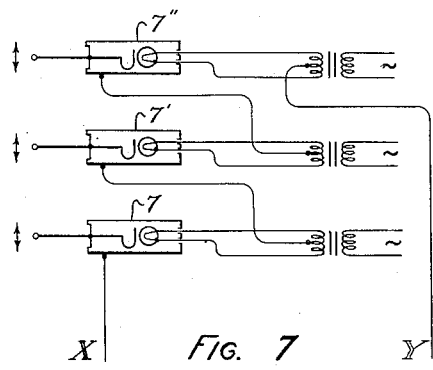

At Fig. 7 the tubes 7, 7', 7'', are connected in series. At Fig. 8 they are connected in parallel as in Fig. 6 but additionally show at 39, 40, 41 means for varying the sensitivity of the different devices, or in other words varying upon the motor 22, the relative effect of the plurality of variable conditions such as steam flow, water flow, water level.

At Fig. 9 I illustrate a portion of the circuit wherein variations in current flow applied at X, Y for control of current flow through the tube 12 causes a vertical positioning of a pilot valve 42, spring opposed, for control of air pressure which may be used in pneumatic control apparatus or arrangement. Such a pilot valve may be of the type described and claimed in the co-pending application of Clarence Johnson #673,212, filed May 27, 1933, Patent No. 2,054,464, September 15, 1936, and wherein vertical positioning of the pilot valve stem 42 results in a variation in fluid pressure in either or both of the pipes leading from the pilot valve casing.

At Fig. 10 I illustrate an embodiment of my invention wherein the motor 43 is not of the reversing type but rotates in a single direction at a speed which is a function of the variable actuating the tube 7 from zero to a maximum speed. Such a motor may be a draft fan driving motor or a pump motor, or similar device, whose speed is desirably to be controlled from the value of a variable such as an operating condition in a furnace or for the control of a variable.

The tube 7 controls the phase of the voltage on the grid of tube 44 through the transformer 45. This varies the current flow through tube 44 and thereby the speed of motor 43. An important feature is that the conductors 46, 47 may be made practically any length of telephone lines, thereby achieving control of a variable at a great distance.

Variation in current flow through the secondary S of the transformer 45 varies the current flow through the primary P as well as the phase angle, for with no current flow through S the current through P is practically 90 degrees lagging with respect to voltage. This turns off the tube 44. The primary P and a resistance 48 are in shunt around the tube 44 and voltage across 48 is 90 degrees lagging with respect to voltage across the tube 44, which thus turns the tube off. With maximum current through S the primary current is practically in phase with the voltage and the grid voltage is the same, resulting in maximum current flow through the tube 44. Thus variation in voltage drop across 48, as well as phase relation, controls current flow through the tube 44 and thereby through the motor 43 for controlling the speed of the motor 43.

While I have illustrated and described certain preferred embodiments of my invention, it will be clear that there are other ways of incorporating the invention in apparatus and electrical circuits and I am not to be limited by the particular showing, but only as to the claims in view of prior art.

Certain features of my invention disclosed but not claimed herein form the subject matter of my co-pending application Serial No. 191,059, filed February 17, 1938.

What I claim as new, and desire to secure by Letters Patent of the United States, is:

1. In a measuring arrangement, in combination, means positioned by a variable to be measured, an electric circuit, an electron discharge device in said circuit and having a plurality of electrodes, said means adapted to change the effective area of one of the electrodes, a plurality of other electron discharge devices in the circuit, and a motor having opposed fields in the circuit, current flow through said first device differentially controlling said plurality of devices for varying the relative energization of said opposed fields.

2. A measuring and controlling system, comprising in combination, means positioned by a variable to be measured and controlled, an electric circuit, an electron discharge device in said circuit and having a plurality of electrodes, said means adapted to change the effective area of one of the electrodes, a plurality of other electron discharge devices in the circuit, a motor having opposed fields in the circuit, current flow through said first device differentially controlling said plurality of devices and varying the relative energization of said opposed fields, an indicator of the value of the variable positioned by the motor, and regulating means for the variable simultaneously positioned by the motor.

3. In combination, means sensitive to the magnitude of a variable, an electron discharge device having relatively movable electrodes for varying their effective areas whereby the resistance of said device to passage of current is varied, means under the control of said first named means for moving one of said elements, a plurality of electron discharge devices, means controlled by the current passed by said first electron discharge device for controlling said plurality of electron discharge devices to produce concurrent variations in opposite senses in the current in their output circuits, a motor having opposed fields, the current in each field under the control of the current in one of said output circuits, and means for moving the other of said electrodes of said first named electron discharge device under the control of said motor.

4. In combination, means sensitive to the magnitude of a variable, an electron discharge device having relatively movable electrodes for varying their effective areas whereby the resistance of said device to passage of current is varied, means under the control of said first named means for moving one of said elements, a plurality of electron discharge devices, means controlled by the current passed by said first electron discharge device for controlling said plurality of electron discharge devices to produce concurrent variations in opposite sense to the current in their output circuits, a motor having opposed windings, the current in each winding under the control of the current in one of said output circuits, and means for moving the other of said electrodes of said first named electron discharge device under the control of said motor.

5. In combination, means sensitive to the magnitude of a variable, an electron discharge device having relatively movable electrodes for varying their effective areas whereby the resistance of said device to passage of current is varied, means under the control of said first named means for moving one of said elements, a plurality of electron discharge devices, means controlled by the current passed by said first electron discharge device for controlling said plurality of electron discharge devices to produce concurrent variations in opposite senses in the current in their output circuits, and a motor having opposed windings, the current in each winding under the control of the current in one of said output circuits.

6. In combination, means sensitive to the magnitude of a variable, an electron discharge device having relatively movable electrodes for varying their effective areas whereby the resistance of said device to passage of current is varied, means under the control of said first named means for moving one of said elements, a motor having opposed windings, and means under the control of the current passed by said first electron discharge device for producing concurrent variations in opposite sense of the current in said windings.

7. In combination, means sensitive to the magnitude of a variable, an electron discharge device having relatively movable electrodes for varying their effective areas whereby the resistance of said device to passage of current is varied, means under the control of said first named means for moving one of said elements, an electric circuit having a plurality of branches in parallel and means under the control of the current passed by said first electron discharge device for producing concurrent variations in opposite senses of the currents in said branches.

8. In combination, means sensitive to the magnitude of a variable, an electron discharge device having relatively movable electrodes for varying their effective areas whereby the resistance of said device to passage of current is varied, means under the control of said first named means for moving one of said elements, a plurality of electron discharge devices, means controlled by the current passed by said first electron discharge device for controlling said plurality of electron discharge devices to produce concurrent variations in opposite senses in the current in their output circuits, a motor having opposed windings, a circuit for each of said windings and an inductive coupling between each of said last named circuits and the output circuit of one of said plurality of electron discharge devices.

JOHN D. RYDER.